United States Patent [19]
Parker et al.

[11] Patent Number: 6,030,089
[45] Date of Patent: Feb. 29, 2000

[54] LIGHT DISTRIBUTION SYSTEM INCLUDING AN AREA LIGHT EMITTING PORTION CONTAINED IN A FLEXIBLE HOLDER

[75] Inventors: Jeffery R. Parker, Strongsville; Terrence P. Hopkins, Lakewood, both of Ohio

[73] Assignee: Lumitex, Inc., Strongsville, Ohio

[21] Appl. No.: 09/189,823

[22] Filed: Nov. 10, 1998

Related U.S. Application Data

[62] Division of application No. 08/147,961, Nov. 4, 1993, Pat. No. 5,894,686.

[51] Int. Cl.[7] .................................................. F21L 15/08
[52] U.S. Cl. .................... 362/103; 362/190; 362/191; 362/158; 362/806; 362/812; 362/198; 36/136; 36/137
[58] Field of Search ................................. 362/190, 191, 362/158, 103, 806, 812, 198; 36/136, 137

[56] References Cited

U.S. PATENT DOCUMENTS

| | | | |
|---|---|---|---|
| 1,408,527 | 3/1922 | Lyhne | 362/190 |
| 2,931,893 | 4/1960 | Arias et al. | 36/1 |
| 2,948,806 | 8/1960 | Anderson | 362/190 |
| 4,130,951 | 12/1978 | Powell | 36/137 |
| 4,234,907 | 11/1980 | Daniel | 362/556 |
| 4,628,418 | 12/1986 | Chabria | 362/191 |
| 4,848,009 | 7/1989 | Rodgers | 36/137 |
| 4,907,132 | 3/1990 | Parker | 362/556 |
| 4,916,596 | 4/1990 | Sharrah et al. | 362/190 |
| 5,005,108 | 4/1991 | Pristash et al. | 362/31 |
| 5,149,489 | 9/1992 | Crews | 362/570 |
| 5,154,506 | 10/1992 | Leard | 362/103 |
| 5,239,450 | 8/1993 | Wall | 362/104 |
| 5,292,345 | 3/1994 | Gerardo | 607/88 |
| 5,558,430 | 9/1996 | Booty, Jr. | 362/190 |

*Primary Examiner*—Sandra O'Shea
*Assistant Examiner*—Ronald E. Delgizzi
*Attorney, Agent, or Firm*—Renner, Otto, Boisselle & Sklar, P.L.L.

[57] ABSTRACT

A light distribution system includes an area light emitting portion, a light source for supplying light to an input edge of the light emitting portion for conduction within the light emitting portion and emission therefrom, and a power source for the light source. A holder may be provided for the light emitting portion. The holder may be made of a flexible material to permit the holder to conform to a contoured surface such as the arm or other body part of a person. Also, a flexible band or belt may be provided for personal wear. The light distribution system may include an additional light source which is directional so it can be seen at a greater distance than the area light emitting portion. An information display system controlled by an interactive switch may also be provided for displaying selected information.

18 Claims, 4 Drawing Sheets

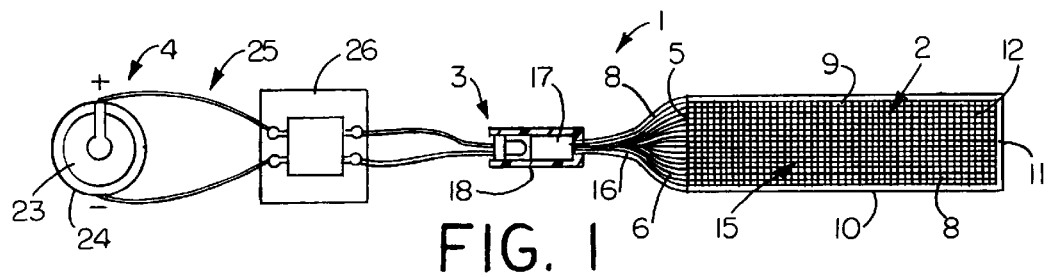
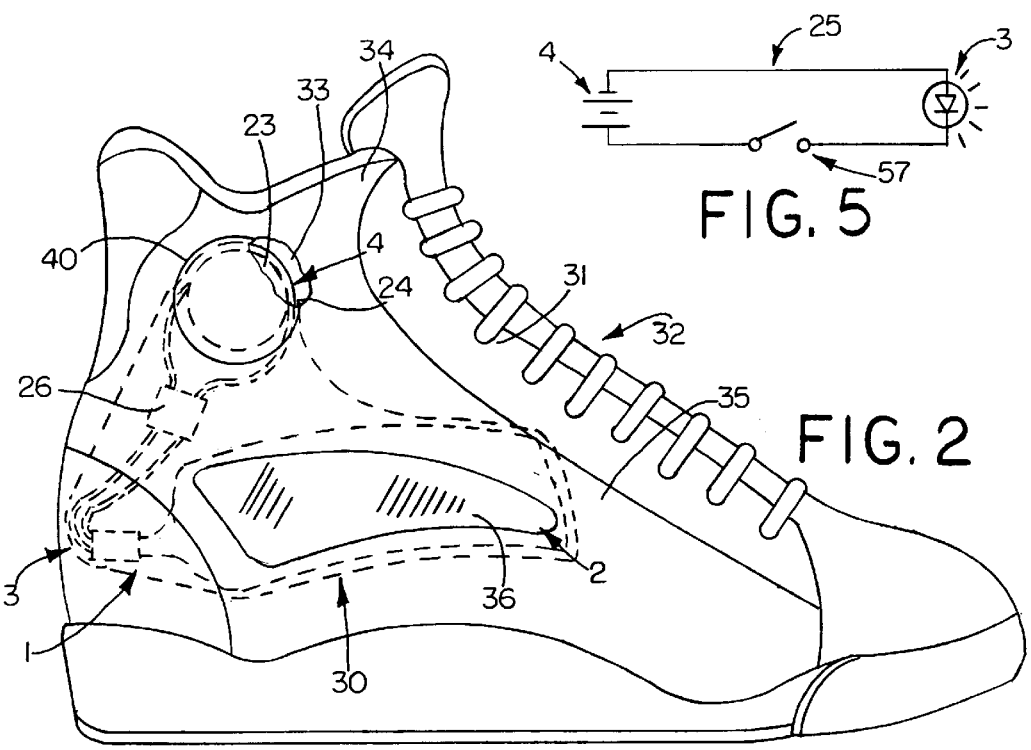
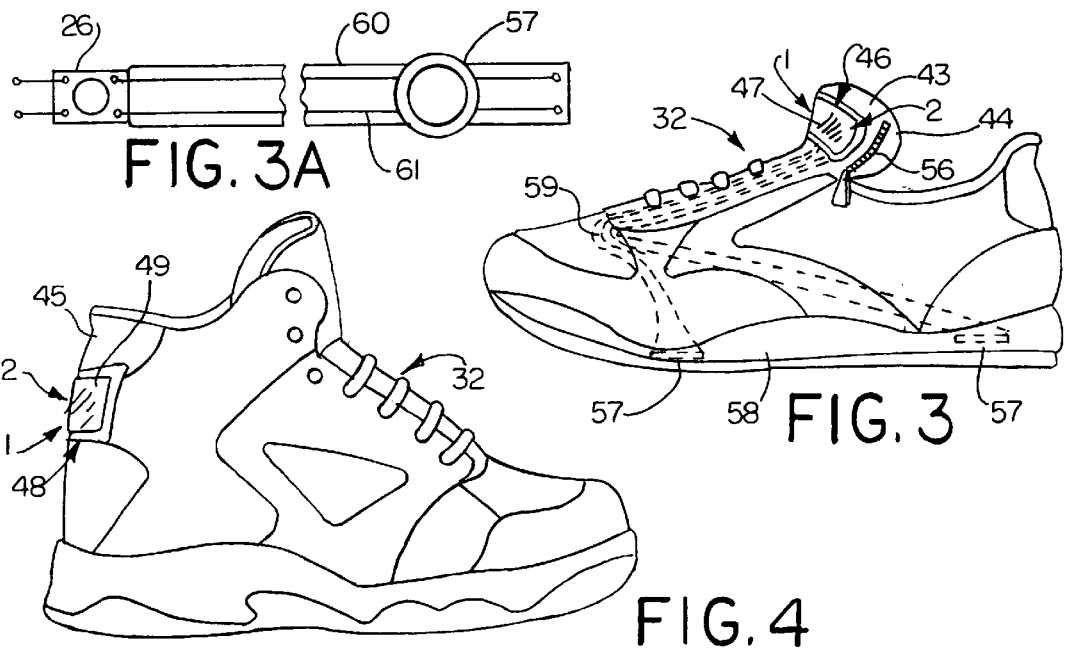

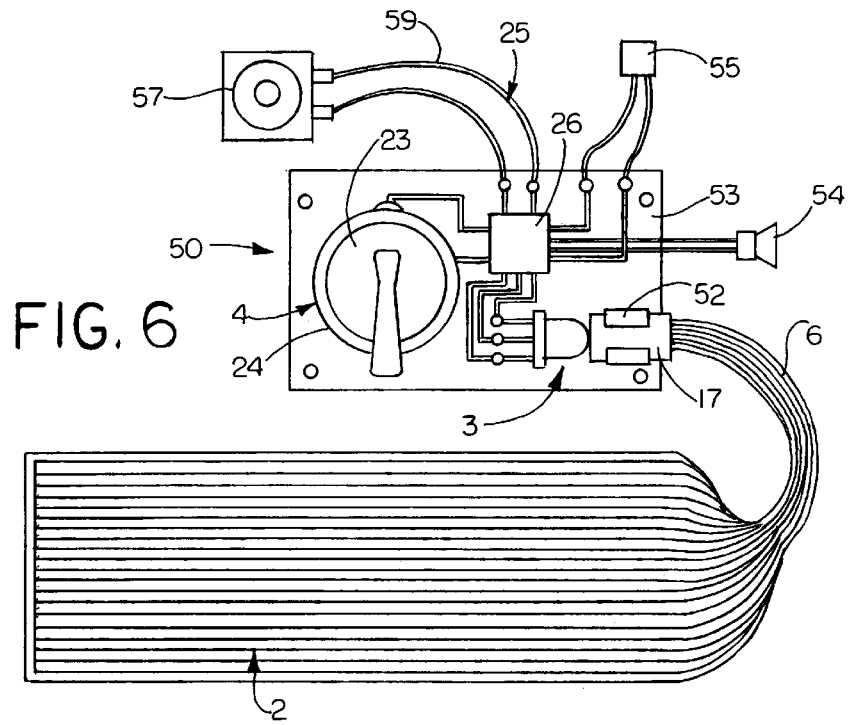
FIG. 6
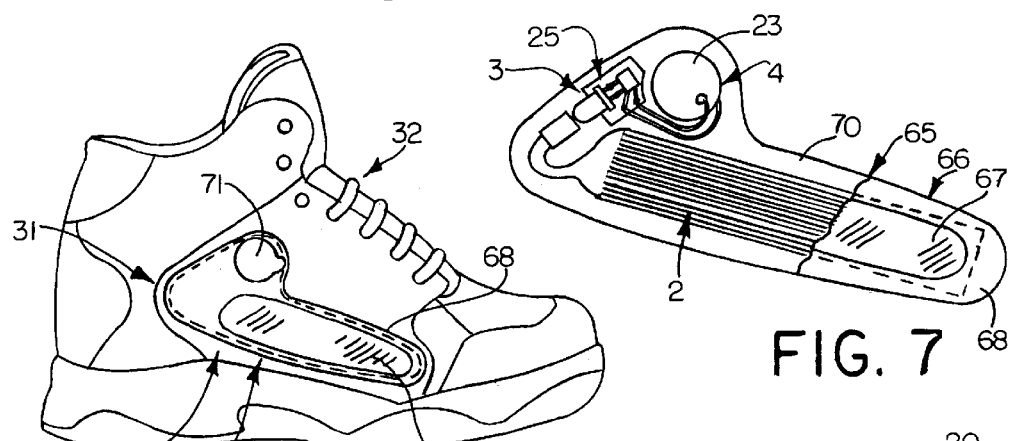
FIG. 7
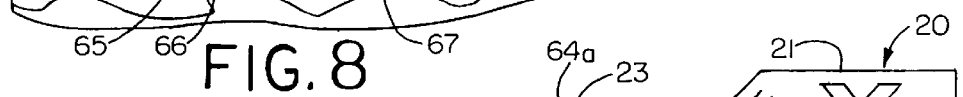
FIG. 8
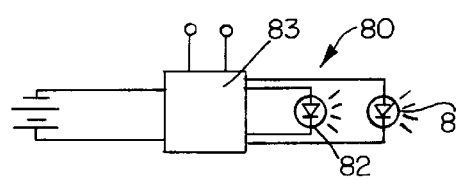
FIG. 11
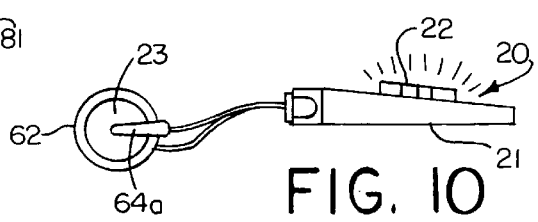
FIG. 9
FIG. 10

LIGHT DISTRIBUTION SYSTEM INCLUDING AN AREA LIGHT EMITTING PORTION CONTAINED IN A FLEXIBLE HOLDER

This application is a divisional of prior application Ser. No. 08/147,961, filed Nov. 4, 1993 now U.S. Pat. No. 5,894,686.

FIELD OF THE INVENTION

This invention relates generally to light distribution systems for distributing light to one or more areas of an object for decorative and/or safety reasons including but not limited to footwear, headwear, clothing and other articles that are intended to be worn by a person; objects intended to be worn by animals such as collars and leashes; and other objects such as toys, sporting equipment, bicycles, and construction barrels and the like. Also this invention relates to display systems for displaying information at one or more areas of an object.

BACKGROUND OF THE INVENTION

Light distribution systems for distributing light to one or more areas of an object are generally known. Such lighting may be used, for example, to increase the visibility of one or more areas of an object for decorative and/or safety reasons. Also, it is generally known to provide different types of switching arrangements for such lighting systems, to cause the lighting systems to turn on and off or intermittently flash on and off as desired. However, there is a continuing need for new and improved light distribution systems to meet the needs of different lighting applications. Also, it is generally known to provide information display systems for displaying different types of information. However, there is a continuing need for providing different types of interactive information display systems at one or more locations on an object.

SUMMARY OF THE INVENTION

The present invention relates to certain improvements in light distribution systems for lighting one or more areas of an object. Also, the present invention relates to certain improvements in providing interactive information displays at one or more locations on an object.

In accordance with one aspect of the invention, the major components of the light distribution systems and/or information display systems of the present invention may be contained in a sealed holder for ease of handling and attachment to an object in any suitable manner, for example, by sewing, gluing, or removably attaching the holder to the object using snaps, zippers, or Velcro strips and the like.

In accordance with another aspect of the invention, the light distribution systems may include a light emitting portion made of woven or non-woven optical fibers or a solid transparent material having one or more deformed output regions which cause light entering the light emitting portion to be emitted therefrom. Alternatively, the light emitting portion may comprise a heat stamped light emitting ribbon, or one or more light pipes, fiber optic rope lights, and/or end lit fiber optic strands.

In accordance with another aspect of the invention, the light source of the light distribution systems may comprise one or more light emitting diodes (LED's), halogen lamps, neon lamps, fluorescent lamps, vacuum lamps, electroluminescent diodes and/or lens end or regular incandescent lamps. Also, flashing and/or multicolored light sources and/or color change mediums may be used to provide different light and/or color effects in the light emitting portion if desired.

In accordance with another aspect of the invention, the light distribution systems may include another light source separate and apart from the light emitting portion for providing direct exterior lighting.

In accordance with another aspect of the invention, the light distribution systems are desirably battery powered for complete portability.

In accordance with another aspect of the invention, the light distribution systems may be turned on or off in a variety of ways, from simply connecting and disconnecting the power source from the light source or using a flashing light source without the need for a separate switch, to using different types of switches to meet a particular application, from a simple on-off switch to a pressure switch, dome switch, timer circuit, motion sensor, membrane switch, mercury switch, reed switch, microprocessor, or integrated circuit and the like.

In accordance with another aspect of the invention, the light source, power source and associated circuitry of the light distribution systems and/or information display systems may be mounted in an upper portion of a shoe or boot or other footwear, including, for example, the sides, back and/or tongue of a shoe or boot. Also, an interactive switch for controlling the operation of the light source and/or information display may be mounted in either the upper or lower portion of a shoe or boot depending on the type of switch actuation desired.

These and other objects, advantages, features and aspects of the present invention will become apparent as the following description proceeds.

To the accomplishment of the foregoing and related ends, the invention, then, comprises the features hereinafter filly described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic top plan view, partly in section, of one form of light distribution system in accordance with this invention;

FIG. 2 is a schematic side elevation view of an athletic shoe showing the light distribution system of FIG. 1 mounted on an upper side portion of the shoe;

FIGS. 3 and 4 are schematic side elevation views of a shoe, similar to FIG. 2, but on a reduced scale, and showing a light distribution system in accordance with this invention mounted in the upper protruding portion of the tongue of the shoe and upper back of the shoe, respectively;

FIG. 3(a) is a schematic top plan view, partly in section, of a strip of cloth or tracing film having a flexible conductive trace for electrically coupling a pressure switch mounted for example in the bottom portion of a shoe with circuitry in the upper portion of a shoe or other object;

FIG. 5 is a schematic circuit diagram showing a pressure switch which may be used to turn the light source of a light distribution system in accordance with this invention on and off;

FIG. 6 is a schematic top plan view of another form of light distribution system in accordance with this invention;

FIG. 7 is a schematic top plan view, partly broken away, of still another form of light distribution system in accordance with this invention contained within a sealed holder;

FIG. 8 is a schematic side elevation view of a shoe showing the light distribution system of FIG. 7 attached to an upper side of the shoe;

FIGS. 9 and 10 are respectively top plan and side elevation views, partly in section, of still another form of light distribution system in accordance with this invention;

FIG. 11 is a schematic circuit diagram including two different colored light emitting diodes (LED's) and an integrated circuit for switching back and forth between the different colored LED's for causing a color change in different areas of the light emitting portion of the light distribution systems of this invention;

Figure 12:
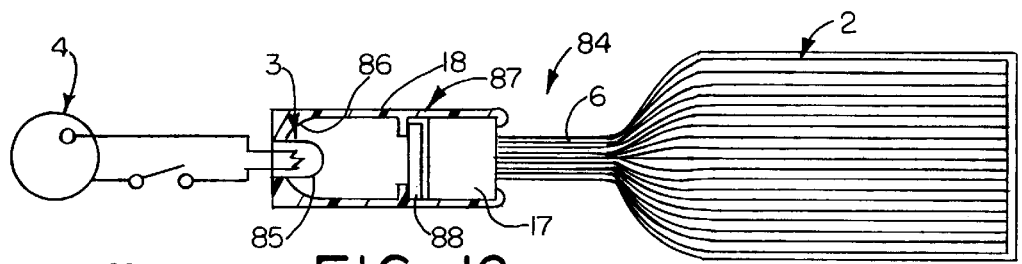
FIG. 12 is a schematic top plan view, partly in section, of another form of light distribution system in accordance with this invention including a color filter for changing the color of the light emitting portion in selected areas.

DETAILED DESCRIPTION OF THE
PREFERRED EMBODIMENTS

Referring now in detail to the drawings, and initially to FIG. 1, there is schematically shown one form of light distribution system 1 in accordance with this invention including a light emitting portion 2, a light source 3, and a power source 4. The light source 3 generates and focuses light, in a predetermined pattern, either directly on an input edge 5 of the light emitting portion 2 or on a transition device 6 which is used to make the transition from the light source target shape to the light emitting portion input edge shape as shown.

The light emitting portion 2 illustrated by way of example in FIG. 1 is comprised of one or more layers of woven or non-woven optical fibers 8 each consisting of one or more optical fiber strands having a light transmitting core portion of a suitable transparent material and an outer sheath or cladding of a second transparent material having a relatively lower index of refraction than the core material to assist in preventing the escape of light along its length. The core material may be made of either glass or plastic or a multi-strand filament having the desired optical characteristics. The index of refraction of the outer sheath material is less than that of the core material, whereby substantially total reflection is obtained at the sheath-core interface, as well known in the art.

To cause light to be emitted from the optical fibers, the external surface of the optical fibers may be disrupted as by scratching, etching or otherwise causing mechanical, chemical or other deformation at discrete locations along their lengths in the manner disclosed, for example, in U.S. Pat. No. 4,885,663, dated Dec. 5, 1989, the disclosure of which is incorporated herein by reference. Alternatively, such deformation may be achieved by bending the optical fibers at a plurality of discrete locations along their lengths such that the angle of each bend exceeds the angle of internal reflection so that light will be emitted at each such bend, as also disclosed in U.S. Pat. No. 4,885,663.

The amount of light emitted at these locations will depend on the depth and frequency of such disruptions or bends. If the optical fibers are deformed at decreasingly spaced intervals as the distance from the light source increases, there will be more uniform emission of light from the emitter surface when viewed from a distance.

When the light emitting portion 2 is made of woven optical fibers, the light emitting portion may be sealed along the side edges 9, 10 and end edge 11 to hold the cross threads (fill threads) 12 in position and keep the light emitting portion from fraying at the edges. Also, a thin film, sheet or coating 15 may be applied to one or both sides of the light emitting portion and joined thereto as by heat sealing, ultrasonic welding, laminating, gluing, epoxying or other suitable method. The clear or translucent film, prismatic film, or coating 15 may be used to protect the light emitting portion and/or diffuse or direct the light output from the light emitting portion. Also, the film, sheet or coating 15 may be used to produce different light or color effects. The coating on the back side of the light emitting portion may comprise a back reflector for reflecting light back through the light emitting portion such that light is emitted from only the front side of the light emitting portion.

At one end of the light emitting portion 2 the optical fibers 8 may be brought together to form a light cable 16 which acts as the transition device 6 to transmit light from the light source 3 to the light emitting portion 2. At the outermost end of the light cable 16 is a connector 17 which serves as an interface between the light source 3 and the optical fiber ends of the cable 16.

Both the connector 17 and light source 3 may be mounted in a common holder 18 which properly orients and positions the connector relative to the light source on a plane substantially perpendicular to the principal optical axis of the light source.

If desired, the light emitting portion 2 may also be made of a solid transparent material having one or more deformed output regions which cause light entering the light emitting portion to be emitted therefrom in the manner disclosed, for example, in U.S. Pat. No. 5,005,108, dated Apr. 2, 1991, the disclosure of which is incorporated herein by reference. Alternatively, the light emitting portion may comprise a heat stamped light emitting ribbon similar to that shown in FIGS. 2 and 3 of U.S. Pat. No. 5,005,108. Moreover, one or more light pipes or fiber optic rope lights and/or end lit fiber optic strands may comprise the light emitting portion. FIGS. 9 and 10 show a light emitting portion 20 in the form of a molded light pipe 21, with raised or relieved lettering or a logo 22 on one surface thereof through which light is emitted from the light pipe.

FIG. 1 shows the use of a light emitting diode (LED) as the light source 3. However, other light sources may also effectively be used for providing light to the light emitting portion 2, including, for example, halogen lamps, neon lamps, fluorescent lamps, vacuum lamps, lens end or regular incandescent bulbs, and electroluminescent diodes, to name a few. Moreover, multiple light sources 3 may be provided for a single light emitting portion 2 or a single light source 3 may be provided for multiple light emitting portions as desired.

To power the light source 3, a battery of any suitable type is desirably used as the power source 4. FIG. 1 shows a coin type battery 23, which may but need not be rechargeable as desired, held in place by a battery holder 24. The battery holder 24 is connected to the light source 3 by suitable circuitry 25 which may but need not include various types of switching for controlling the operation of the light source, depending on the particular application.

In the embodiment shown in FIG. 1, the circuitry 25 includes an integrated circuit 26 which may for example include a motion sensor for on and off switching of the light source 3 and/or a flasher chip for flashing the light source when in the on mode. Other types of switches that may be used for different applications, include, for example, pressure switches, dome switches, timer circuits, motion sensors, membrane switches, mercury switches, simple on-off switches, microprocessor circuits, and so on. However, if desired, the light source could be turned on and off without the need for any switch, simply by inserting and removing the battery from the battery holder or turning the battery over. Also, flashing of the light source may be achieved without the need for a switch simply by using a conventional flashing LED.

The various light distribution systems of the present invention are intended to be used for increasing the visibility of one or more areas of different objects for decorative and/or safety reasons. For example, the light distribution systems may be used to provide lighting for athletic shoes, inline skates, boots, ski boots, motorcycle or bicycle helmets, hats, and wearing apparel. Also, the light distribution systems may be used to provide area lighting for animal collars and leashes and other objects such as toys, sporting equipment, bicycles, and construction barrels, to name a few.

FIG. 2 shows the light distribution system 1 of FIG. 1 installed in a pocket 30 on or in the upper portion 31 of a shoe 32. The pocket 30 may be provided between the shoe lining 33 and outer shoe covering 34 at any desired location on the upper portion of the shoe, for example, on a side 35 of the shoe, for receipt of the various components of the light distribution system 1. In the outer surface of the pocket 30 is a window 36 which overlies a sufficient area of the light emitting portion 2 for light emission. The window 36 may have a logo or other text either printed directly on the window or on an adhesive overlay applied thereto for ease of changing of the text as desired.

To provide access to the battery 23 to permit removal and replacement, a zipper, closeable flap or removable cap 40 is desirably provided in the pocket exterior in overlying relation to the battery holder 24. The cap 40 may be secured in place as by threads or a snap fit as desired.

If an integrated circuit 26 is used to control the switching of the light source 3 on and off, the integrated circuit is also desirably mounted in the pocket 30 in the upper portion of the shoe as schematically shown in FIG. 2. The integrated circuit 26 may include a motion sensor or flasher chip or other suitable switching device to turn the light source on and off. Also, in the on state, the integrated circuit may be used to flash the light source at a predetermined pulse width or pattern.

In lieu of or in addition to mounting the light distribution system 1 on or in the upper side 35 of the shoe, the light distribution system may be mounted on or in an outwardly protruding portion 43 of the tongue 44 of the shoe 32 or the upper back side 45 of the shoe 32 as schematically shown in FIGS. 3 and 4, respectively. In the case of FIG. 3, a pocket 46 for the light distribution system 1 is provided in the tongue 44 of the shoe, with a window 47 in the forwardly facing side of the tongue overlying the light emitting portion 2 to emit light through the window. Likewise, in the case of FIG. 4, a pocket 48 for the light distribution system 1 is provided in the upper back side 45 of the shoe, with a window 49 in the exterior of the pocket in overlying relation to the light emitting portion 2 to emit light to the shoe exterior through the window 49.

FIG. 6 shows another form of light distribution system 50 in accordance with this invention in which the light source 3 and battery holder 24 for the battery 23 and associated circuitry 25 as well as a holder 52 for the connector 17 on the light input end of the transition device 6 are mounted on a common support 53 for ease of assembly and installation as required. The support 53 may either be flexible or preformed to correspond to the shape of the shoe or foot or other object at the location where the light distribution system is to be installed. For example, if the light distribution system 50 is to be installed in a pocket 46 in the tongue 44 of a shoe, the support 53, if preformed, would have a slightly curved shape to match the curved upper portion of the foot adjacent the tongue. The pocket 46 would of course have to be large enough for receipt of both the support 53 and associated components mounted thereon and light emitting portion 2. However, the support 53 with components mounted thereon could be placed behind the light emitting portion 2 by making the pocket 46 of sufficient depth to receive them both in stacked relation.

The circuitry 25 shown in FIG. 6 may also include a solar powered battery charger, a charger jack and/or on/off switch 55, which may be accessed through a zippered opening 56 or the like in the outer surface of the pocket 46 as schematically shown in FIG. 3.

Different sounds such as music, talking voices or other sounds may also be produced by incorporating microprocessors or sound chips of various types into the circuitry 25 of the light distribution system 50 for broadcasting over a speaker 54. Such a system may be made interactive by providing one or more switches of various types at different locations on an object such as a shoe which when touched or otherwise engaged will produce different sounds and/or flash rates.

The only time the entire light distribution system of the present invention could not be mounted in an upper portion of a shoe would be if it was desired to provide an interactive pressure switch in the sole or heel of the shoe to cause the light source to flash whenever the sole or heel of the shoe struck the ground. Such a pressure switch 57 is schematically shown in FIG. 6. Also, FIG. 3 schematically shows the location of such a pressure switch 57 in the bottom portion 58 of a shoe either where the ball or heel of the foot presses against the bottom sole when the shoe strikes the ground.

The pressure switch 57 may be connected to the circuitry 25 in the pocket 46 in the upper portion of the shoe by suitable wiring 59 which may extend between the inner lining and outer covering of the shoe as further schematically shown in FIG. 3. Alternatively, a strip of cloth or tracing film 60 made for example of mylar having a flexible conductive trace 61 therein, schematically shown in FIG. 3(a), may be inserted between the inner lining and outer covering of the shoe 32 of FIG. 3 in lieu of the wires 59 for electrically coupling the switch 57 in the bottom portion of the shoe with the integrated circuit or other circuitry 26 in the upper portion of the shoe or other object.

If desired, when a pressure switch 57 is provided in the bottom portion of a shoe, the integrated circuit 26 of FIG. 6 may be eliminated as schematically shown in FIG. 5. Moreover, a battery holder 62 may, if desired, perform the function of a pressure switch, by providing a compression spring 63 which normally maintains the battery 23 out of engagement with a contact 64 in the bottom of the holder as schematically shown in FIGS. 9 and 10. Whenever pressure is applied to the battery holder top contact 64a, the spring 63 is compressed, causing the battery to engage the bottom contact 64 and complete the circuit. In order for the battery holder 62 shown in FIGS. 9 and 10 to function as a pressure switch, it would of course have to be mounted in the bottom portion of the shoe. Access to the battery could be provided by lifting up the insole of the shoe. Similarly, a membrane switch with a snap action dome may be mounted in the bottom portion of the shoe to flash the light source without the need for an integrated circuit.

FIG. 7 shows another form of light distribution system 65 in accordance with this invention which may be generally the same as the light distribution systems previously described, except that the entire light distribution system including the light emitting portion 2, light source 3 and power source 4 and associated circuitry 25 are contained in a sealed holder 66 which may be molded or otherwise formed out of a flexible material. The holder 66 provides a pocket for the light distribution system 65 and has a window 67 in the front side 68 for the emission of light from the light emitting portion 2.

The mounting of such a light distribution system within such a sealed holder 66 provides a complete unit or package that may readily be secured to any object including the upper portion of a shoe as by sewing or gluing the back side 70 of the flexible holder 66 in place on the upper portion 31 of a shoe 32 as schematically shown in FIG. 8. Alternatively, suitable fasteners or Velcro strips (not shown) may be used to removably secure the holder 66 in place. Also, the holder 66 may be made of multiple sections for ease of assembly or installation of the light distribution system 65 if desired.

Access to the battery 23 may be through a zipper, cap or closable flap 71 in the holder 66 as further schematically shown in FIG. 8. Alternatively, the entire light distribution system 65 including the battery 23 and other parts may be completely sealed within the holder 66 whereby should the battery or any other part fail, the entire holder 66 and light distribution system 65 may be disposed of and replaced as a unit.

The pocket or holder windows 36, 47, 49 and 67 through which the light is emitted may be made of a clear or translucent material. Also, the windows may be provided with a diffuser or prismatic surface for diffusing or directing the light output from the light emitting portion. Moreover, the windows may have a raised molded area to provide a desired lighting effect, or as previously indicated, a logo or text may be applied to the windows using an adhesive overlay that will permit the logo or text to be changed as desired.

Different lighting effects may also be achieved by using different types of switching circuitry. For example, the circuitry used may include different types of timers including count-down timers to control both the length of time and when the light source is turned on and off. Also, suitable circuitry may be used to cause the light source to flash at different rates to establish a desired cadence during jogging or running.

Different color effects may also be achieved, for example, by providing a light source such as shown at 80 in FIG. 11 for the light distribution system which includes two or more different colored LED's 81, 82, and an integrated circuit 83 that switches the different LED's on and off at different times or cadences to indicate different modes of operation (i.e. time, speed, etc.).

Figure 13:
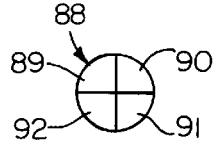
FIG. 13 is a front elevation view of the color filter of FIG. 12.

FIG. 12 shows still another form of light distribution system 84 in accordance with this invention which may be substantially the same as the light distribution systems previously described, including a light emitting portion 2 having a transition device 6 and connector 17 at one end, a light source 3 for providing light to the transition device 6, and a power source 4 for the light source. Also, the light distribution system shown in FIG. 12 includes a common holder 18 for the connector 17 and light source 3. In this particular case, the light source 3 is a lens end or regular incandescent or halogen bulb 85 which extends into the end of the holder 18 opposite the connector 17 and is surrounded by a reflector surface 86 for focusing the light on the connector. Also, the holder 18 includes a chamber 87 that contains a medium that absorbs or reflects different frequencies of light. The particular medium shown in FIG. 12 is a colored filter 88 that has different colored areas, for example, four different colored areas 89–92 as schematically shown in FIG. 13. The colored filter 88 is free to move or rotate within the chamber 87 with motion, which changes the color of the light output from the light emitting portion 2 in selected areas.

Figure 14:
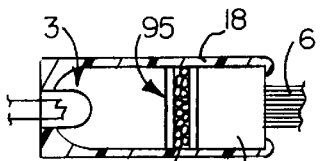
FIGS. 14 and 15 are fragmentary longitudinal sections through other filter mediums that may be used to absorb or reflect different frequencies of light for changing the color of the light emitting portion in selected areas.
Figure 15:
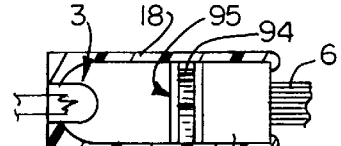

Alternatively, the color change medium may be colored translucent beads 93 made of glass or plastic fragments, or an oil and water medium 94 contained in a chamber 95 within the holder 18 as schematically shown in FIGS. 14 and 15.

Figure 16:
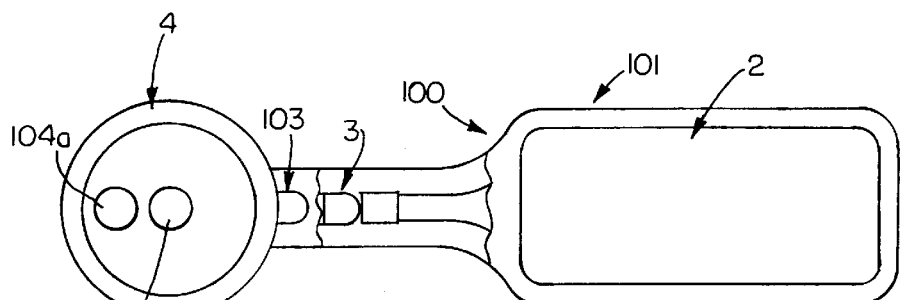
FIG. 16 is a schematic top plan view, partly in section, of another form of light distribution system in accordance with this invention including two or more light sources, one for illuminating a light emitting portion, and another for providing direct exterior lighting.

FIG. 16 shows yet another form of light distribution system 100 in accordance with this invention including a light emitting portion 2, light source 3 and power source 4 and associated circuitry (not shown) contained in a sealed holder 101, similar to the light distribution system 65 and holder 66 shown in FIG. 7. Also, the light distribution system 100 desirably includes at least one additional light source 103 which may, for example, be a light emitting diode directly viewable from the exterior of the holder. This additional light source 103 desirably has a relatively narrow light emission angle to provide directional lighting for long range/daytime viewing, in contrast to the much larger area light emitting portion 2 which is not very visible except when it is dark/dusk. One or more suitable switches 104, 104a such as momentary contact switches may also be provided on the exterior surface of the holder 101 for turning both light sources 3 and 103 on or off simultaneously or independently of each other as desired.

Figure 17:
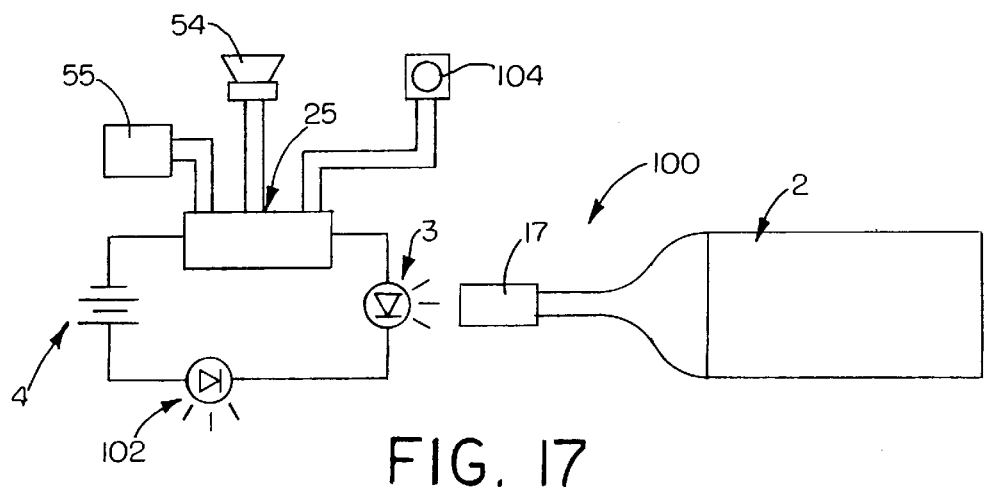
FIG. 17 is a schematic circuit diagram of the light distribution system of FIG. 16 including additional optional features.

FIG. 17 is a schematic circuit diagram of the light distribution system 100 of FIG. 16 including two light sources 3 and 103, a light emitting portion 2 illuminated by the light source 3, and a momentary contact switch 104 for actuating the circuitry 25. In addition, the circuitry 25 may include a microprocessor and/or sound chips of various types for broadcasting different sounds over a speaker 54, similar to the light distribution system 50 shown in FIG. 6. Also, the light distribution system 100 shown in FIG. 17 may include a solar powered battery charger, a charger jack and/or an on/off switch 55 similar to that shown in FIG. 6.

Figure 18:
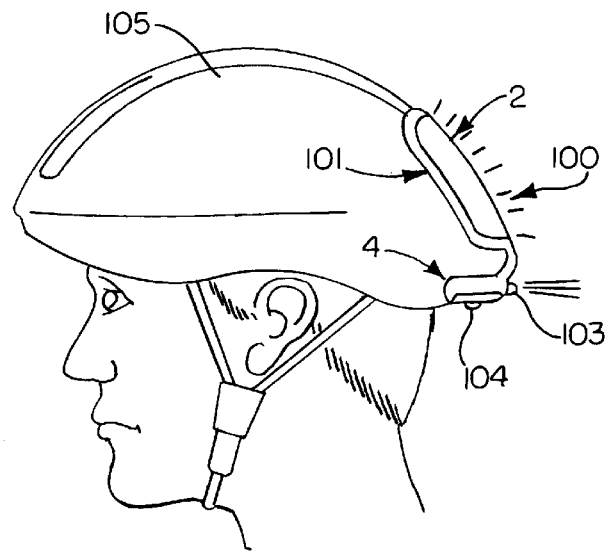
FIG. 18 is a schematic side elevation view of a bicycle helmet showing the light distribution system of FIGS. 16 and/or 17 mounted on the back side thereof.

The light distribution system 100 may be used in a manner similar to the light distribution systems previously described for decorative and/or safety lighting. FIG. 18 shows such a light distribution system 100 attached to the back side of a bicycle helmet 105 with the light emitting portion 2 extending up the back side of the helmet and the power source/battery 4 and associated circuitry wrapped around the lower back edge of the helmet with the directly exposed light source 103 pointed to the rear for easy detection of the bicycle rider in poor lighting conditions by drivers of vehicles approaching from the rear. The holder 101 for the light distribution system 100 may be made of a flexible plastic or rubber-like material to permit it to be easily bent to fit the helmet shape. Alternatively, the holder 101 may be molded/formed to a relatively rigid shape that readily fits the helmet shape.

Figure 19:
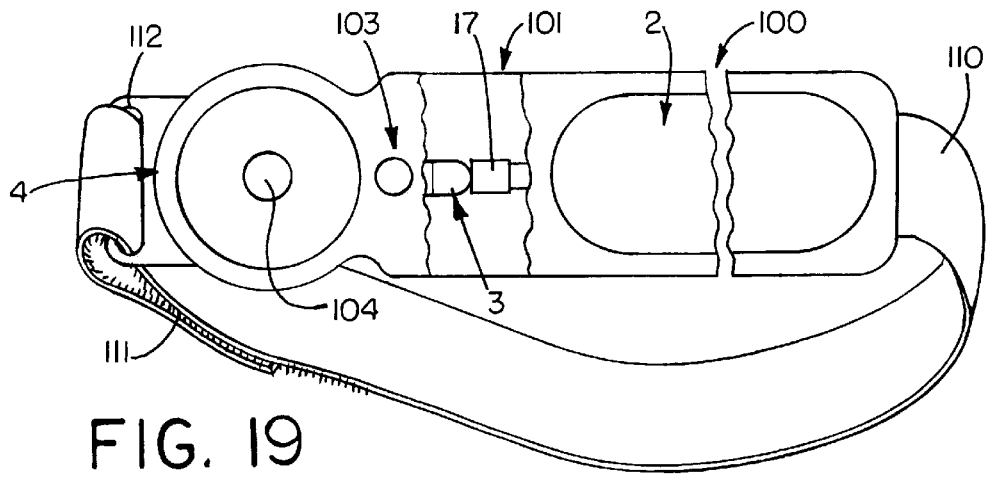
FIG. 19 is a schematic perspective view of a band or belt showing the light distribution system of FIGS. 16 and/or 17 mounted thereon.

FIG. 19 shows another application for the light distribution system 100 of FIGS. 16 and/or 17, attached to a band or belt 110 for wearing around the arm or other body part of a person. The band or belt 110 may be provided with a Velcro strip 111 or other suitable fastening means at one end for removably securing the band or belt around a person's arm or other body part as desired after looping such one end through a slot 112 in the other end.

Figure 20:
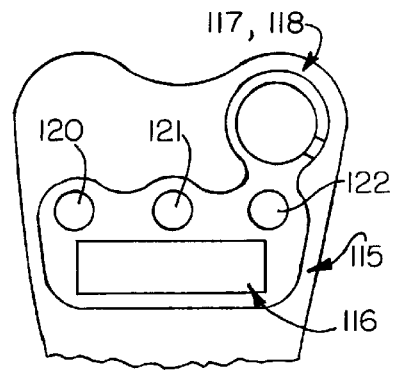
FIG. 20 is a schematic side elevation view of a portion of a shoe or boot showing one form of information display systems in accordance with this invention including a liquid crystal display (LCD) mounted thereon.

FIG. 20 shows an information display system 115 in accordance with this invention in which a liquid crystal display (LCD) 116 is provided in addition to or in lieu of any one of the light distribution systems previously described. The information display system 115 shown in FIG. 20 includes, in addition to the LCD 116, a power source/battery 117 and associated circuitry 118 including, for example, a microprocessor for producing or measuring information in different modes.

The LCD 116 may, but need not be backlit as desired. Also, several different switches may be provided including for example one switch 120 for turning the LCD 116 on and off, another switch 121 for selecting different operating modes of display, and still another switch 122 for starting and stopping or indexing the operation of the display. Moreover, the information display system 115 may be made interactive by connecting the system to one or more switches at different locations on an object such as on the toe or heel of a shoe similar to FIGS. 3 and 3(*a*) which when touched or otherwise engaged will display different types of information as desired.

Such a display system makes possible the use of different types of LCD displays, including for example information, logo and message displays. Other types of LCD displays that may be incorporated into such a display system when attached for example to a shoe or boot or an arm or wristband are a pedometer, clock, timer, lap timer, stopwatch, hang time timer, heart rate monitor, and/or force measurement device. Also, such a display system may be attached to different types of wearing apparel and provided with an LCD display which may act as a warning indicator to detect unsafe levels of different environmental conditions such as smoke, temperature, exposure, gas, and/or chemicals.

The display system 115 of FIG. 20 is shown mounted on the tongue 125 or other part of a hiking boot. In that particular application the LCD 116 may be used for example to display such information as distance of travel, pedometer, altitude, time, and/or direction of movement. Also interactive switches located for example in the bottom of the shoe or boot may be used to control the operation of the display system.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A light distribution system for providing area lighting comprising an area light emitting portion, a light source for supplying light to an input edge of said light emitting portion for conduction within said light emitting portion and emission therefrom, a power source for said light source, and a holder for said light emitting portion, said holder having a window through which light is emitted from said light emitting portion, said holder being made of a flexible material to permit said holder to conform to a contoured surface.

2. The system of claim 1 further comprising another light source contained within said holder, said another light source being directional to provide directional lighting for longer range viewing than said area light emitting portion.

3. The system of claim 2 wherein said holder is attached to a band or belt for wearing by a person.

4. The system of claim 2 further comprising interactive switch means for controlling the operation of said light sources.

5. The system of claim 1 further comprising an information display, and an interactive switch for controlling the operation of said information display.

6. A light distribution system comprising an area light emitting portion, a light source for supplying light to an input edge of said area light emitting portion for conduction within said light emitting portion and emission therefrom, a power source for said light source, a holder for said light emitting portion and said light source, said holder including a window through which light is emitted from said area light emitting portion, and a flexible band or belt for securing said holder around an arm or other body part of a person.

7. The system of claim 6 wherein said holder is made of a flexible material to permit said holder to conform to the arm or other body part of a person.

8. The system of claim 6 wherein said band or belt includes a fastening device for removably securing said band or belt around a person's arm or other body part.

9. The system of claim 8 wherein said band or belt has a slot in one end for looping of an other end of said band or belt through said slot before securing said fastening device.

10. The system of claim 6 further comprising circuit means for controlled switching of said light source.

11. The system of claim 10 wherein said circuit means is located within said holder.

12. The system of claim 6 wherein said power source comprises a battery located in said holder, said holder having a closeable access opening which when opened permits removal and replacement of said battery.

13. The system of claim 6 further comprising interactive switch means for controlling the operation of said light source.

14. A light distribution system comprising an area light emitting portion, a light source for supplying light to an input edge of said area light emitting portion for conduction within said area light emitting portion and emission therefrom, a power source for said light source, a holder for said area light emitting portion and said light source, said holder including a window through which light is emitted from said area light emitting portion, and means for securing said holder to a contoured surface, said holder being made of a flexible material to permit said holder to conform to said contoured surface.

15. The system of claim 14 wherein said contoured surface comprises an arm or other body part of a person, and said means for securing comprises a flexible band or belt for securing said holder around such arm or other body part.

16. The system of claim 14 wherein said holder also contains circuit means for controlled switching of said light source.

17. The system of claim 14 wherein said holder contains an interactive switch for controlled switching of said light source.

18. The system of claim 14 wherein said power source comprises a battery located in said holder, said holder having a closeable access opening which when opened permits removal and replacement of said battery.

* * * * *